(12) United States Patent
Kim et al.

(10) Patent No.: US 7,747,100 B2
(45) Date of Patent: Jun. 29, 2010

(54) ADAPTIVE DIRECTIONAL EDGE-PRESERVING FALSE CONTOUR FILTERING

(75) Inventors: Jae-Seung Kim, Yongin-si (KR); Wonseok Ahn, Seoul (KR); Rae-Hong Park, Seoul (KR); Bo Ra Lim, Seoul (KR); Ji Won Lee, Seoul (KR)

(73) Assignees: Samsung Electronics Co., Ltd., Suwon-si (KR); Industry-University Cooperation Foundation Sogang University, Seoul (KR)

( * ) Notice: Subject to any disclaimer, the term of this patent is extended or adjusted under 35 U.S.C. 154(b) by 1172 days.

(21) Appl. No.: 11/330,055

(22) Filed: Jan. 12, 2006

(65) Prior Publication Data

US 2006/0269159 A1   Nov. 30, 2006

(30) Foreign Application Priority Data

May 31, 2005   (KR) .................. 10-2005-0046465

(51) Int. Cl.
*G06K 9/40* (2006.01)
*G09G 5/00* (2006.01)

(52) U.S. Cl. ................. 382/275; 382/264; 382/269; 345/611

(58) Field of Classification Search ......... 382/254–275, 382/199; 345/581, 600, 611; 348/27
See application file for complete search history.

(56) References Cited

U.S. PATENT DOCUMENTS 4,366,507 A * 12/1982 Mori .................... 358/3.26

(Continued)

FOREIGN PATENT DOCUMENTS

JP   06-225179 A * 8/1994

(Continued)

OTHER PUBLICATIONS

Lee, J.W., et al. (Feb. 2006) "Two-stage false contour detection using directional contrast features and its application to adaptive false contour reduction." IEEE Trans. on Consumer Electronics, vol. 52 No. 1, pp. 179-188.*

(Continued)

*Primary Examiner*—Brian P Werner
*Assistant Examiner*—Barry Drennan
(74) *Attorney, Agent, or Firm*—Sughrue Mion, PLLC

(57) ABSTRACT

A method for adaptive false contour reduction includes: detecting contour location information by removing a flat region having certain brightness values from a first input image based on a bright value difference between the first input image and a second input image with a bit depth of the first input image reduced; detecting false-contour direction and location information by measuring directional contrast of the flat region-removed first image, and distinguishing the false contour area and an edge area out of the false contour location information based on the measured contrast; and smoothing the false contour area by using the false contour direction and location information, and removing the false contour from the first input image. Thus, a flat region can be automatically removed by using a brightness value difference between a bit depth-reduced image and an original input image and detect a false contour, thereby enhancing a precision degree of false contour detection. Further, signal components can be prevented from being degraded by performing smoothing over only a false contour.

21 Claims, 11 Drawing Sheets

U.S. PATENT DOCUMENTS

| | | | |
|---|---|---|---|
| 4,561,022 A * | 12/1985 | Bayer | 348/622 |
| 5,025,478 A * | 6/1991 | Morris et al. | 382/199 |
| 5,343,309 A * | 8/1994 | Roetling | 358/3.07 |
| 5,920,356 A * | 7/1999 | Gupta et al. | 348/606 |
| 6,094,508 A * | 7/2000 | Acharya et al. | 382/199 |
| 6,414,657 B1 * | 7/2002 | Kasahara et al. | 345/63 |
| 6,707,952 B1 * | 3/2004 | Tan et al. | 382/268 |
| 6,941,016 B1 * | 9/2005 | Wagman et al. | 382/199 |
| 2005/0207492 A1 * | 9/2005 | Pao | 375/240.16 |

FOREIGN PATENT DOCUMENTS

| | | |
|---|---|---|
| JP | 2003-015587 A | 1/2003 |
| JP | 2003-304400 A | 10/2003 |
| KR | 10-2004-0072070 A | 8/2004 |

OTHER PUBLICATIONS

Song, W-J., et al. (Aug. 1988) "Edge-preserving noise filtering based on adaptive windowing." IEEE Trans. on Circuits and Systems, vol. 35 No. 8, pp. 1048-1055.*

Joy, G. et al. (Mar. 1996) "Reducing false contours in quantized color images." Computers and Graphics: Techniques for Virtual Environments, vol. 20 No. 2, pp. 231-242.*

ISO/IEC Standard 14496-2:2001(E). (Dec. 2001) "Information technology—coding of audio-visual objects—part 2: visual.".*

Moravec, H.P. (Jul. 1983) "The Stanford Cart and the CMU Rover," Proc. of the IEEE, vol. 71 No. 7, pp. 872-884.*

Daly et al. (Jun. 2004) "Decontouring: prevention and removal of false color artifacts." SPIE vol. 5292, pp. 130-149.*

* cited by examiner

ADAPTIVE DIRECTIONAL EDGE-PRESERVING FALSE CONTOUR FILTERING

CROSS-REFERENCE TO RELATED APPLICATIONS

This application claims benefit under 35 U.S.C. §119 from Korean Patent Application No. 2005-46465, filed on May 31, 2005, the entire contents of which are incorporated herein by reference.

BACKGROUND OF THE INVENTION

1. Field of the Invention

Methods and apparatuses consistent with the present invention relate to adaptive false contour reduction, and more particularly, to adaptive false contour reduction which is capable of removing a false-contour region by detecting the false-contour region of an input image and smoothing only the false-contour region.

2. Description of the Related Art

As display devices are increasing in size in the digital television (DTV) era, an artifacts problem rises which did not appear in the past. That is, there is no artifacts problem when images are displayed on a cathode ray tube (CRT) monitor or a small-sized TV, but various artifacts problems have come up with larger and wider TV screens in the DTV era. In order to obtain much clearer images, images input in digital data are image-processed by an enhancement process such as Contrast Enhancement (CE), Detail Enhancement (DE), and the like, but there has emerged a side effect of artifacts that was not taken into account in the past.

Artifacts refer to unnatural components on images, which contains diverse kinds of noise occurring due to limits to the Charge Coupled Device (CCD) sensor, mosquito noise, dynamic false contours due to characteristics of display devices, ghosts occurring due to problems in transmission channels, and so on. The false contours are typical of such artifacts. The false contours refer to contour-shaped artifacts appearing on a flat region of an image such as sky, water surface, skin, or the like. The flat region can be referred to as a region of which brightness is gradually changing rather than a region of which pixels have the exact same values. If such a flat region has some distinct brightness values to an extent offensive to eyes, the flat region has parts appearing like contour lines. The eye-offensive contour lines in the flat region are referred to as false contours or false edges, which are differentiated from edges being a signal component of an image.

The false contour occurs due to various causes, but, in general, mainly occur at the time the quantization level for a brightness value is not enough. The quantization level determining a brightness value is decided based on the number of bits (a bit depth) expressing a digitized brightness value. The false contour does not appear to an extent of the existing bit depth, but appears on the scaled-up display devices. Further, the false contour appears at the time of the CE or the DE process and even at the time of compressions or decompressions of images into or from Joint Photographic Experts Groups (JPEG) or Moving Picture Experts Groups (MPEG). The conventional false contour removal methods include the blue noise mask method, dithering method, Daly and Feng method, and so on.

FIG. 1 is a view for explaining the conventional Daly and Feng method for removing a false contour. The bit depth of an input image is P, and the bit depth of an input image through a low-pass filter 10 is R.

In the conventional false contour removal method, an image having the bit depth of P is input to the low-pass filter 10 which smoothes the image by adding adjacent pixels to the pixels of the input image. The input image passing through the low-pass filter 10 increases its bit depth since the adjacent pixels are added to the pixels of the image. Thus, the bit depth R of an input image passed through the low-pass filter 10 becomes higher than the bit depth P of an input image.

The quantization unit 20 re-quantizes the pixel values of the input image having the bit depth increased through the low-pass filter 10.

Further, the first adder 30 outputs a difference value between an output value of the low-pass filter 10 and an output value of the quantization unit 20.

The second adder 40 outputs a difference value between an output value of the first adder 30 and the original image. That is, the second adder 40 adds to the original image a difference between a re-quantized pixel value and an original pixel value. Thus, the brightness value of the input image is gradually changed so that a false contour disappears since the second adder 40 adds to the original image a difference value between a value of the original image and the re-quantized value.

However, the conventional Daly and Feng false contour removal method is applied to all pixels of an input image. Thus, the method has a problem that an output image has edges or texture corresponding to signal components which are degraded to become blurry since the entire input image passes through the low-pass filter. Further, the method has a problem since it can be applied only with limited conditions assuming that the bit depth of an input image is lower than the bit depth of an output image or knowing an original image prior to false contour occurrence due to quantization.

Further, the conventional false contour removal method can be properly applied when the causes of the false contour are known, and has limitations that false contour can not be precisely determined. In particular, the Daly and Feng method can not be used as a proper false contour removal method at the time a difference between a value obtained through a low-pass filter and a re-quantized value is not enough for false contour removal.

Accordingly, it is necessary to first detect a false contour from an input image and adaptively remove only the detected false contour.

SUMMARY OF THE INVENTION

An aspect of the present invention is to provide a method and apparatus for adaptive false reduction that removes a flat region from an input image to detect a contour region, detects a false contour region again from the contour region, and removes the false contour by applying directional smoothing filtering only over the detected false contour.

According to an aspect of the present invention, there is provided a false contour removal method, comprising detecting contour location information by removing a flat region having certain brightness values from a first input image based on a bright value difference between the first input image and a second input image with a bit depth of the first input image reduced; detecting false-contour direction and location information by measuring directional contrast of the flat region-removed first image, and distinguishing the false contour area and an edge area out of the false contour location information based on the measured contrast; and removing the false contour from the first input image by smoothing the false contour area by using the false contour direction and location information.

The detecting the contour location information includes steps of outputting the second input image with the bit depth of the first input image reduced; calculating a brightness difference value between the first and second input images, and calculating an absolute value of the difference value; and detecting as a contour location a location at which the absolute value of the difference value varies.

The distinguishing the false contour area and the edge area includes steps of measuring directional contrast values about a center pixel as a target on which it is decided deciding whether to be a false contour in the flat region-removed first input image, and detecting a direction having a maximum contrast value; and comparing the maximum contrast value and a threshold value, and deciding the center pixel as a false contour if the maximum contrast value is lower than the threshold value.

The maximum contrast value is detected based on an equation as below:

$$contrast_{max} = \max\left[\sum_{i=0}^{M-1}\sum_{j=0}^{N-1}\frac{(I_{i,j}-I_{i+1,j})^2}{MN}, \sum_{i=0}^{M-1}\sum_{j=0}^{N-1}\frac{(I_{i,j}-I_{i+1,j+1})^2}{MN}, \sum_{i=0}^{M-1}\sum_{j=0}^{N-1}\frac{(I_{i,j}-I_{i+1,j-1})^2}{MN}, \sum_{i=0}^{M-1}\sum_{j=0}^{N-1}\frac{(I_{i,j}-I_{i+1,j+1})^2}{MN}\right]$$

in here, M and N denote numbers indicating sizes of masks used in a contour area, I denotes a brightness of a location of a contour line detected out of the first input image, i and j denote pixel positions, and Iij denotes a center pixel.

Further, the false contour area and the edge area are distinguished based on any of distribution, entropy, flat, and uniformity of the flat region-removed first input image, and the false contour is removed based on the false-contour location information.

The removing the false contour removes the false contour by vertically filtering the false contour pixel by pixel by a one-dimensional direction smoothing filter.

The number of taps of the one-dimensional directional smoothing filter is adjusted depending on whether the edge area is included in a filtering range.

A coefficient h(n) of the one-dimensional directional smoothing filter is expressed in an equation as below:

$$h(n) = \frac{1}{16} \times [1, 1, 2, 2, 4, 2, 2, 1, 1]$$

Further, a direction of the one-dimensional directional smoothing filter is calculated based on an equation as below:

$$\theta_{ij}^{f} = \theta_{ij} - 90°$$

where $\theta_{ij}^{f}$ denotes the direction of the one-dimensional directional smoothing filter, and $\theta_{ij}$ denotes a direction of the detected false contour.

According to an aspect of the present invention, there is provided an apparatus comprising a flat region removal part for detecting contour location information by removing a flat region having certain brightness values from a first input image based on a bright value difference between the first input image and a second input image with a bit depth of the first input image reduced; a false contour detection part for detecting false-contour direction and location information by measuring directional contrast of the flat region-removed first image, and distinguishing the false contour area and an edge area out of the false contour location information based on the measured contrast; and a smoothing part for removing the false contour from the first input image by smoothing the false contour area by using the false contour direction and location information.

The flat region removal part comprises a bit depth reduction unit for outputting the second input image with the bit depth of the first input image reduced; a first arithmetic logic unit for calculating a brightness difference value between the first and second input images; second arithmetic logic unit for calculating an absolute value of the difference value; and a detection unit for detecting as a contour location a location at which the absolute value of the difference value varies.

The false contour detection part includes a measurement unit for detecting a maximum contrast value by measuring directional contrast values about a center pixel as a target on which it is decided whether to be a false contour in the flat region-removed first input image; and a comparison unit for deciding the center pixel as a false contour if the maximum contrast value is lower than the threshold value by comparing the maximum contrast value and a threshold value.

If the center pixel is decided to be the false contour, the measurement unit outputs information of a direction having the maximum contrast value to the smoothing part, and, if the center pixel is decided to be the false contour, the comparison unit outputs location information of the center pixel to the smoothing part.

The comparison unit detects the maximum contrast value by using an equation as below:

$$contrast_{max} = \max\left[\sum_{i=0}^{M-1}\sum_{j=0}^{N-1}\frac{(I_{i,j}-I_{i+1,j})^2}{MN}, \sum_{i=0}^{M-1}\sum_{j=0}^{N-1}\frac{(I_{i,j}-I_{i+1,j+1})^2}{MN}, \sum_{i=0}^{M-1}\sum_{j=0}^{N-1}\frac{(I_{i,j}-I_{i+1,j-1})^2}{MN}, \sum_{i=0}^{M-1}\sum_{j=0}^{N-1}\frac{(I_{i,j}-I_{i+1,j+1})^2}{MN}\right]$$

in here, M and N denote numbers indicating sizes of masks, I denotes a brightness of a location of a contour line detected out of the first input image, and i and j denote pixel positions, and Iij denotes a center pixel.

Further, the false contour detection part distinguishes the false contour area and the edge area by using any of distribution, entropy, flat, and uniformity of the flat region-removed first input image, and the smoothing part removes the false contour by using the false-contour location information.

The smoothing part is a one-dimensional directional smoothing filter, and removes the false contour by vertically filtering the false contour area pixel by pixel by the one-dimensional directional smoothing filter.

The number of taps of the one-dimensional directional smoothing filter is adjusted depending on whether the edge area is included in a filtering range.

A coefficient h(n) of the one-dimensional directional smoothing filter is expressed in an equation as below:

$$h(n) = \frac{1}{16} \times [1, 1, 2, 2, 4, 2, 2, 1, 1]$$

Further, a direction of the one-dimensional directional smoothing filter is calculated based on an equation as below:

$$\theta_{ij}^f = \theta_{ij} - 90°$$

where $\theta_{ij}^f$ denotes the direction of the one-dimensional directional smoothing filter, and $\theta_{ij}$ denotes a direction of the detected false contour.

According to an aspect of the present invention, there is provided a computer-readable recording medium containing execution code providing a false contour removal method comprising steps of detecting contour location information by removing a flat region having certain brightness values from a first input image based on a bright value difference between the first input image and a second input image with a bit depth of the first input image reduced; distinguishing a false contour area and an edge area out of the false contour location information by using directional contrast measured over the flat region-removed first image; and removing the false contour from the first input image by smoothing the false contour area.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Hereinafter, the present invention will be described in detail with reference to the accompanying drawings.

Figure 1:
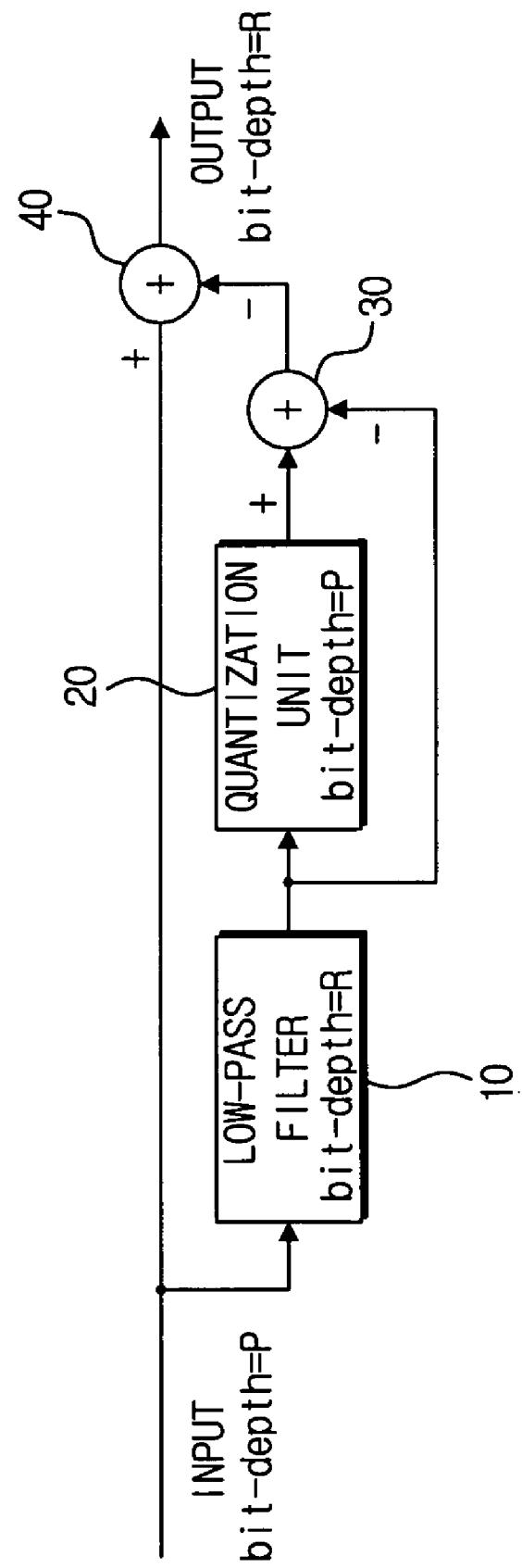
FIG. 1 is a view for explaining a conventional false contour removal method.
Figure 2:
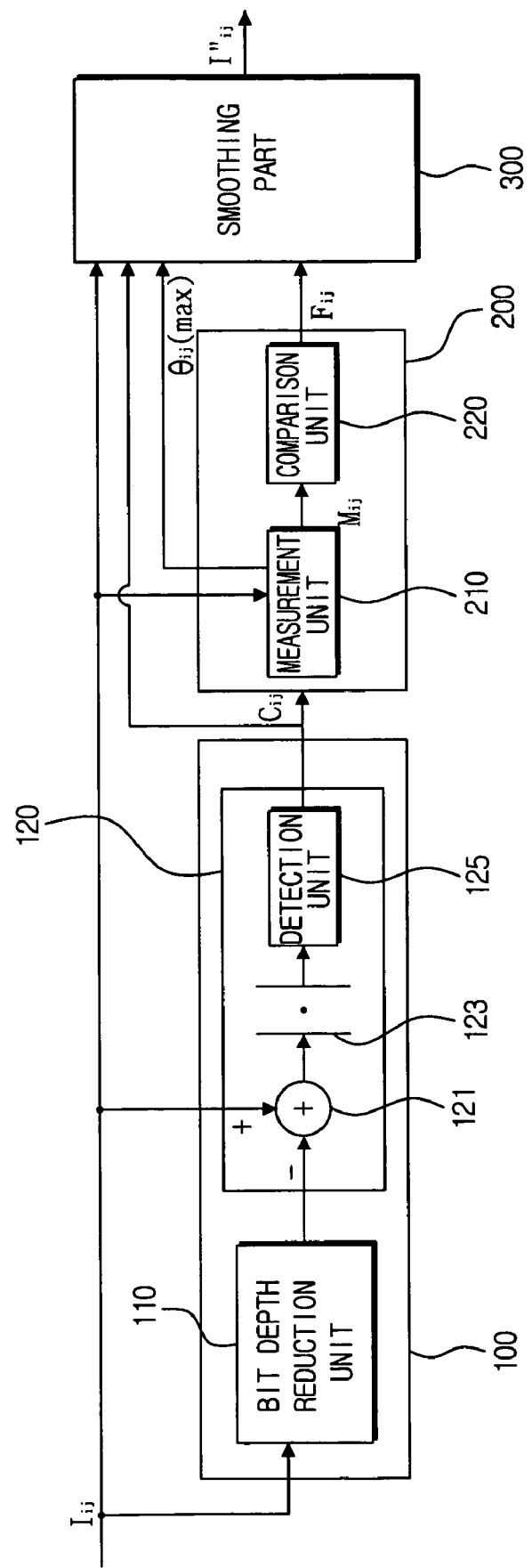
FIG. 2 is a block diagram for showing an apparatus according to an exemplary embodiment of the present invention.

FIG. 2 is a block diagram for showing an apparatus according to an exemplary embodiment of the present invention.

In FIG. 2, the apparatus has a flat region removal part 100, a false contour detection part 200, and smoothing part 300.

First, the flat region removal part 100 includes a bit depth reduction unit 110 and a contour detection unit 120, removes a flat region with homogeneous brightness values from a first input image $I_{ij}$, and detects contour location information including a false contour and edges.

In detail, the flat region removal part 100 detects contour location information including a false contour and edges from a first input image by using a brightness value difference between the first input image and a second input image with a bit depth of the first input image reduced. Since the false contour corresponds to a noise component appearing like an edge area in the flat region, the false contour is searched for in the flat region. However, the false contour in a flat region can be easily distinguished through the naked eye, but it is difficult to distinguish a flat region from a false contour area through physical properties. Thus, the flat region removal part 100 detects a false contour from a flat region by generating an image having a different bit depth and using a brightness value difference between the created image and an original image.

The bit depth reduction unit 110 outputs a second input image having a bit depth lower than the first input image. As the bit depth reduction unit 110 reduces a bit depth to be lower than the bit depth of the first input image input to the flat region removal part 100, the bit depth reduction unit 110 can generate a second input image having a higher brightness value difference compared to the first input image.

The contour detection unit 120 has a first arithmetic logic unit 121, a second arithmetic logic unit 123, and a detection unit 125. The first arithmetic logic unit 121 calculates a brightness value difference between the first input image and the second input image having a bit depth lower than that of the first input image, and the second arithmetic logic unit 123 calculates an absolute value of the difference value calculated from the first arithmetic logic unit 121. Further, the detection unit 125 detects a position having a varied absolute value out of absolute values of the difference values between the first and second input images, and detects the detected position as a location of a contour area containing a false contour and edges.

The false contour detection part 200 includes a measurement unit 210 and a comparison unit 220, and detects a flat region-removed false contour area, out of the contour area $C_{ij}$, containing a false contour and edges and detected by the flat region removal part 100. The false contour detection part 200 detects a false contour out of the contour area by using the directionality of the false contour. The false contour detection part 200 detects information on false contour directions and locations based on contrast values measured in four directions about a target pixel on which it is decided whether to be a false contour.

However, the false contour detection part 200 can be implemented to detect a false contour area by measuring flat which is a standard referring to an extent of similarity of brightness of a concerned pixel against brightness of neighboring pixels or by using a directional weighting mask. Further, the false contour detection part 200 can detect a false contour by using entropy, flat, variance, uniformity, and so on, rather than using the properties that the false contour has its directionality.

The measurement unit 210 measures contrast in four directions about a target pixel on which it is decided whether to form a false contour in the contour area detected by the contour detection unit 120, and detects a maximum value of the measured contrast values. Thus, the measurement unit 210 detects information on a direction of the maximum brightness value and information $M_{ij}$ on a center pixel position about a candidate pixel for the false contour.

The comparison unit 220 compares a threshold value with the maximum contrast value detected by the measurement unit 210, and, if the maximum contrast value is lower than the threshold value, decides the center pixel as a false contour. If the center pixel is decided as the false contour, the comparison unit 220 outputs center pixel position information $F_{ij}$ to the smoothing part 300 in order to remove the false contour.

Further, the smoothing part 300 performs smoothing over only the false contour area detected by the false contour detection part 200 out of the first input image in order to remove the false contour. The smoothing part 300 can be a one-dimensional directional smoothing filter, and performs filtering over pixels in the perpendicular direction of a direction of the detected false contour area.

The number of filter taps can be controlled, and it is preferable to adopt 9 taps for the number of taps in the filter. Further, the filter coefficient is preferably, but not necessarily, decided as an odd number to be in symmetry about the pixel detected as the false contour. Occasionally, the signal component such as edges can be contained in a filtering range of the one-dimensional directional smoothing filter. Thus, at the time a signal component is included in a filtering range of a filter, smoothing is performed at the location detected as a false contour with taps reduced.

In detail, the smoothing part 300 inputs information, $\theta_{ij}$ (max), on a direction having the maximum contrast value from the measurement unit 210, and inputs location information $F_{ij}$ on a false contour from the comparison unit 220. The smoothing part 300 performs filtering in the perpendicular direction of the detected false contour based on the location and direction information about the false contour, and removes the false contour. Thus, the smoothing part 300 can output a first false contour-removed input image $I''_{ij}$.

Figure 3:
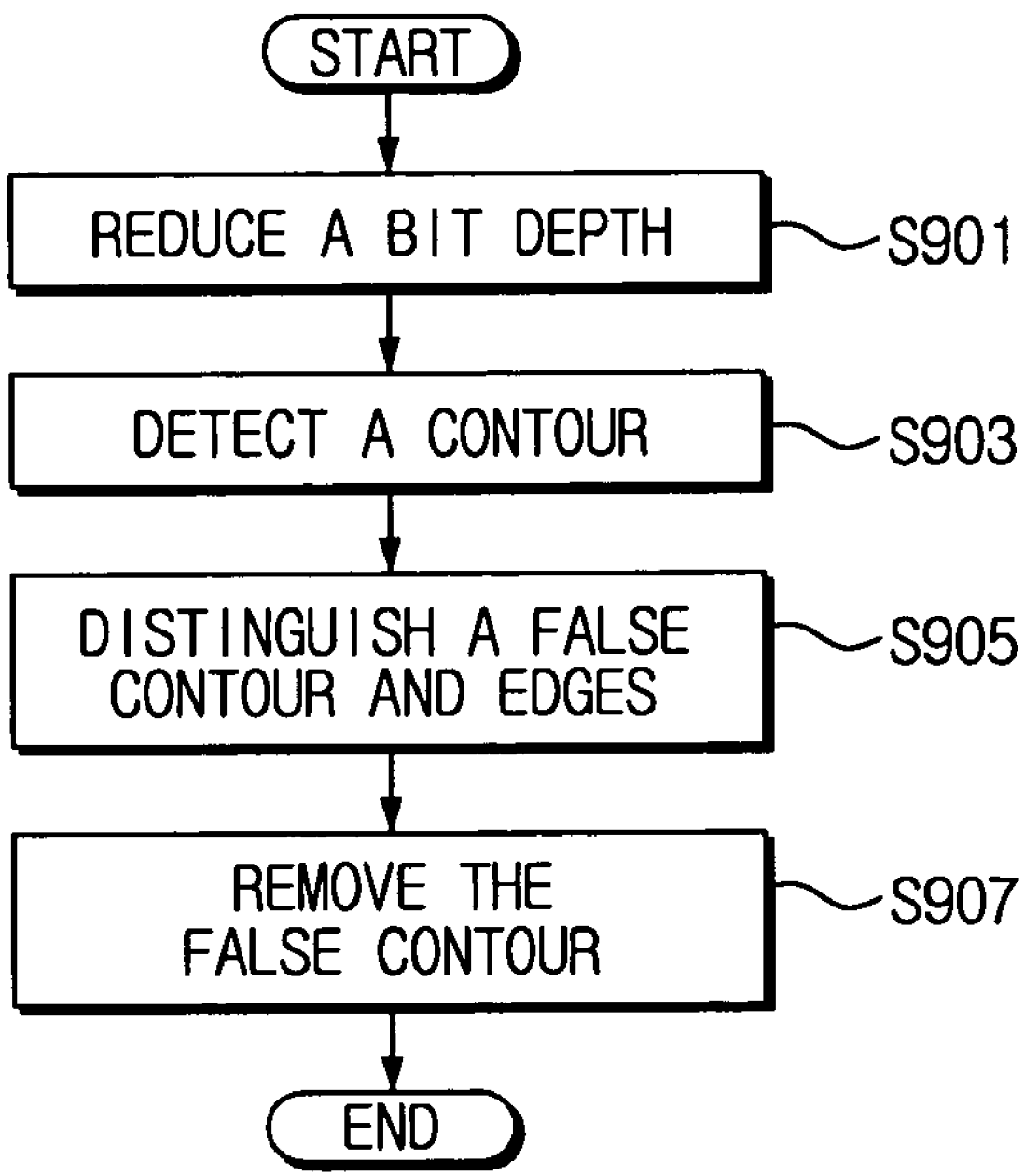
FIG. 3 is a flow chart for explaining a false contour removal method according to an exemplary embodiment of the present invention.

FIG. 3 is a flow chart for explaining a false contour removal method according to an exemplary embodiment of the present invention. FIG. 4A to FIG. 4D are views for explaining operations for removing a flat region from the first input image, and FIG. 5A to FIG. 5D are views for explaining a direction of the one-dimensional directional smoothing filter used for smoothing a false contour area.

Referring to FIG. 3, the bit depth of the first input image being an original image is reduces, and a second input image is output (S901).

Next, a flat region from the first input image is removed, and a contour area is detected (S903). The flat region is removed from the first input image by using a difference value between the first input image and the second input image, and the contour area is detected.

An image can be divided into a flat region being a low-frequency component and edges being a high-frequency component, and the contour belongs to the high-frequency component, but can be considered as an intermediate component between the flat region and the edges which appear in the flat region. Since the false contour has intermediate physical properties between the flat region and the edges that are signal components, a flat region is separated by using a bit depth difference in order to separate a false contour without degrading the signal components. That is, an image having a different bit depth is generated, and a flat region is separated by using a brightness value difference between the generated image and an original image with no bit depth reduction.

Figure 4A:
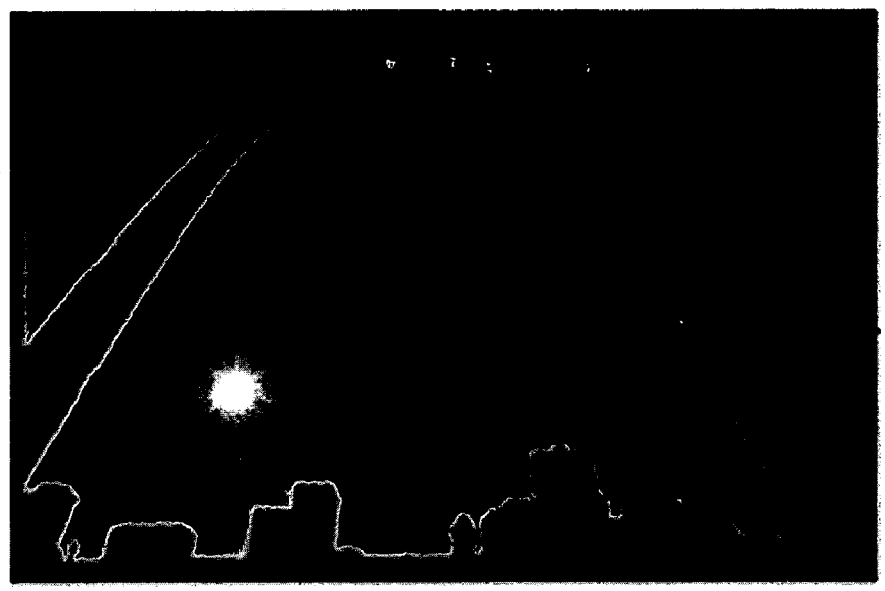
FIG. 4A to FIG. 4D are views for explaining operations for removing a flat region of a first input image.
Figure 4B:
Figure 4C:
Figure 4D:
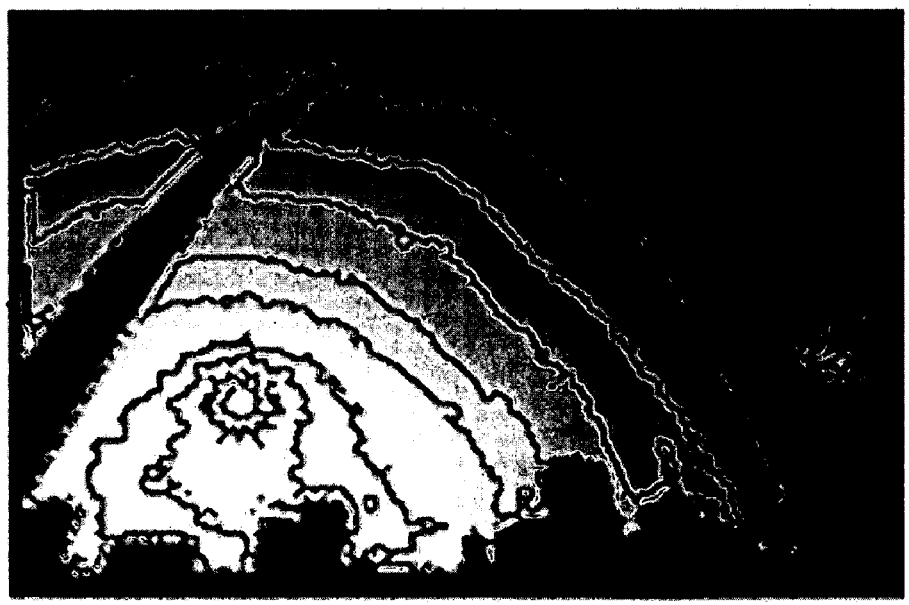

FIG. 4A to FIG. 4D are views for explaining operations for detecting a contour area by removing a flat region of the first input image. FIG. 4A is a view for showing the first input image, FIG. 4B is a view for showing a second input image with a bit depth reduced. Further, FIG. 4C is a view for showing a difference between the first input image and the second input image, and FIG. 4D is a view for showing a contour area.

FIG. 4A shows a first 8-bit depth input image in a brightness value of 256 quantized levels. As shown in FIG. 4B, the method can arbitrarily generate a second input image having a lower bit depth such as 7-bit depth, 6-bit depth, 5-bit depth than the 8-bit depth of the first input image.

Further, when a difference between the first input image and the second input image is obtained, a binary image shown in FIG. 4C is generated. FIG. 4D shows a contour obtained from the binary image of FIG. 4C, and shows edges and a false contour obtained when the flat region is removed from the first input image. The contour area is detected from a binary image, that is, an area having a difference value varying on the binary image obtained from a difference between the first input image and the second input image is detected as a contour location of the first input image.

Next, the method distinguishes a false contour and edges from the detected contour (S905). In order to distinguish the false contour and edges from the detected contour, applicable methods are a method taking into account the properties that a false contour has directionality by using variance, contrast, entropy, uniformity, and so on, and a method not taking the directionality into account.

Preferably, but not necessarily, the method detects the maximum value of contrast values measured in four directions about a pixel being a target on which it is decided whether to be a false contour in an area detected as a contour by using the properties that a false contour has directionality. The maximum value of the directional contrast values measured can be detected using Equation 1 below:

$$contrast_{max} = \max \left[ \sum_{i=0}^{M-1}\sum_{j=0}^{N-1} \frac{(I_{i,j} - I_{i+1,j})^2}{MN}, \sum_{i=0}^{M-1}\sum_{j=0}^{N-1} \frac{(I_{i,j} - I_{i+1,j+1})^2}{MN}, \sum_{i=0}^{M-1}\sum_{j=0}^{N-1} \frac{(I_{i,j} - I_{i+1,j-1})^2}{MN}, \sum_{i=0}^{M-1}\sum_{j=0}^{N-1} \frac{(I_{i,j} - I_{i+1,j+1})^2}{MN} \right]$$  [Equation 1]

In Equation 1, M and N denote numbers indicating sizes of masks used in a contour area, 1 denotes a brightness of a location of a contour line detected out of the first input image, and i and j denote pixel positions. Iij denotes a center pixel for which a mask is used and which is a target on which it is decided whether to be a false contour. A direction having the maximum contrast value is detected, and, if the detected direction is decided as a false contour, the direction information can be used when the false contour is removed.

Further, the false contour is decided as a center pixel if the maximum value of the directional contrast values is measured to be less than the threshold value. The position information of the center pixel detected as a false contour is used when the false contour is removed. However, if a false contour is detected in a contour area by using a method which does not use the properties that a false contour has directionality, only the location information of the false contour is used when the false contour is removed.

Next, smoothing is performed for removing the detected false contour (S907). The operation S907, smoothing is performed over only the false contour by using the direction and location information of a center pixel decided as the false contour detected in the operation S905, and the false contour is removed from the first input image.

The one-dimensional directional smoothing filter is used for false contour removal. The one-dimensional directional smoothing filter has four directions of 0°, 45°, 90°, and 135°, and has the vertical relation to the false contour direction. That is, the directions of the one-dimensional directional smoothing filter can be expressed by Equation 2 as below.

$$\theta_{ij}^f = \theta_{ij} - 90°$$ [Equation 2]

In Equation 2, $\theta_{ij}^f$ (denotes direction information of the one-dimensional directional smoothing filter, and $\theta_{ij}$ denotes a direction of the detected false contour.

Figure 5A:
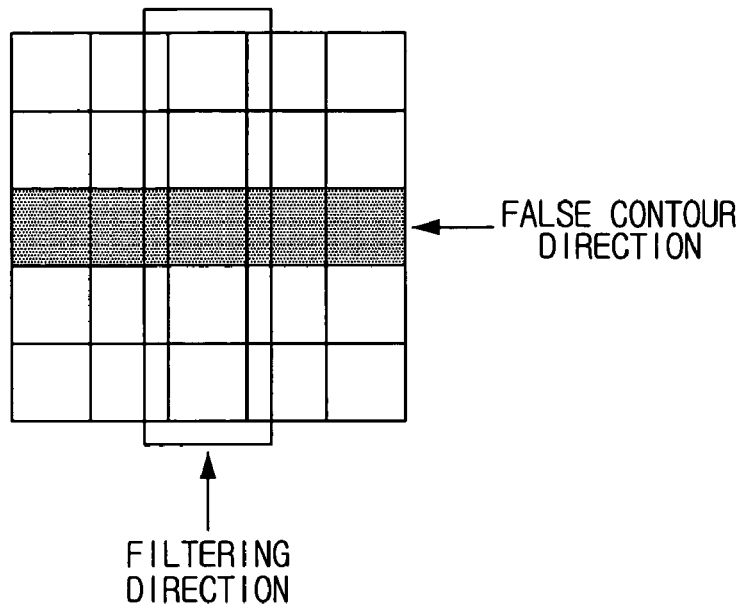
FIG. 5A to FIG. 5D are views for explaining a direction of a one-dimensional directional smoothing filter used for smoothing a false contour region.
Figure 5B:
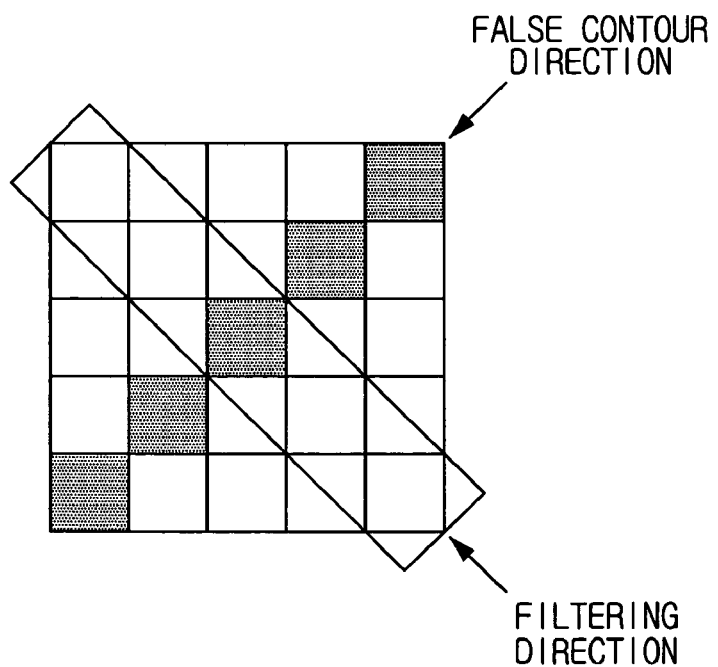
Figure 5C:
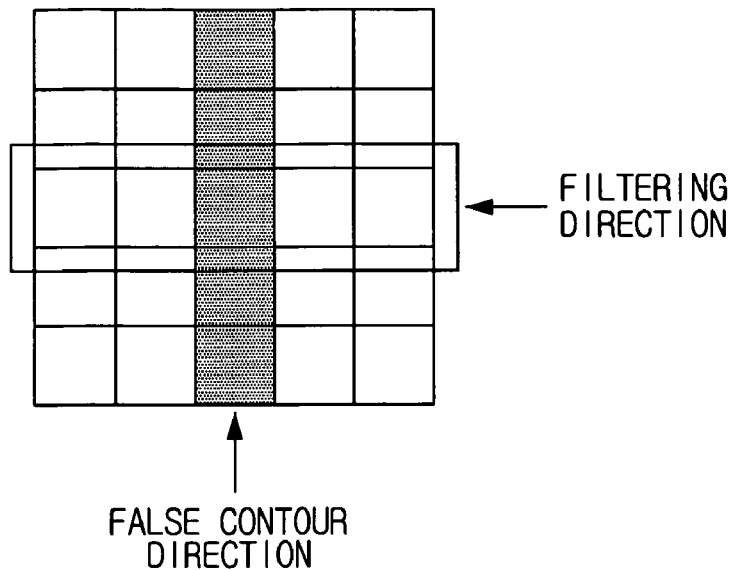
Figure 5D:
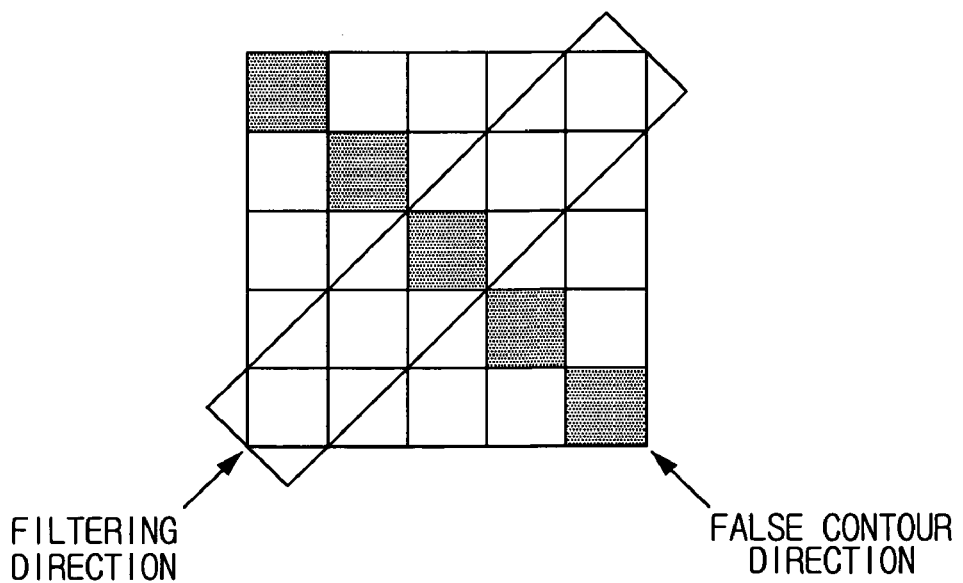

FIG. 5A to FIG. 5D are views for explaining a direction of the one-dimensional directional smoothing filter used for smoothing a false contour area. In FIG. 5A to FIG. 5D, the direction of the detected false contour is perpendicular o the direction of the one-dimensional directional smoothing filter. As shown in FIG. 5A, if a false contour is detected to be in the horizontal direction, the direction of the one-dimensional directional smoothing filter is in the vertical direction. As expressed in Equation 2, the direction $\theta_{ij}^f$ of the one-dimensional directional smoothing filter becomes 90° since $\theta_{ij}$ is 90°. Thus, the one-dimensional directional smoothing filter performs smoothing at the vertical direction, 90°, of the detected false contour. A filter coefficient h(n) of the one-dimensional directional smoothing filter can be expressed by Equation 3 below.

$$h(n) = \frac{1}{16} \times [1, 1, 2, 2, 4, 2, 2, 1, 1].$$ [Equation 3]

The filter coefficient of the one-dimensional directional smoothing filter can adjust the number of taps if a signal component is included in a filtering range. The adjustment of the filter taps enables filtering to be adaptively performed over a signal.

If the one-dimensional directional smoothing filter re-calculates a pixel value by including an area detected as a false contour as well as an edge area, the newly calculated pixel value together with the edge area turns into a value having a big difference from its neighboring pixel value, which can turn into a pixel having an abrupt value like impulse noise. Thus, the number of taps of the one-dimensional directional smoothing filter is adjusted so that an edge area is not included upon smoothing over a false contour area. The number of filter taps is basically 9 taps, but decided to be an odd number of 5, 7, 9, and so on adaptively to a signal component, so that the number of filter taps is adjusted to be symmetrical about a center pixel detected as a false contour. For example, as expressed in Equation 3, if a 9-tap filter is adjusted in the number of filter taps to a 7-tap filter, the coefficient h(n) of the 7-tap filter can be expressed in Equation 4 as below.

$$h(n) = \frac{1}{14} \times [1, 2, 2, 4, 2, 2, 1]$$ [Equation 4]

Thus, after a false contour area is detected from an input image, the one-dimensional directional smoothing filter performs smoothing over only the false contour area, thereby exactly removing the false contour without degrading the input image.

Figure 6A:
FIG. 6A to FIG. 6D are views for explaining an application of the present invention to a region of an input image on which no false contour exists.
Figure 6B:
Figure 6C:
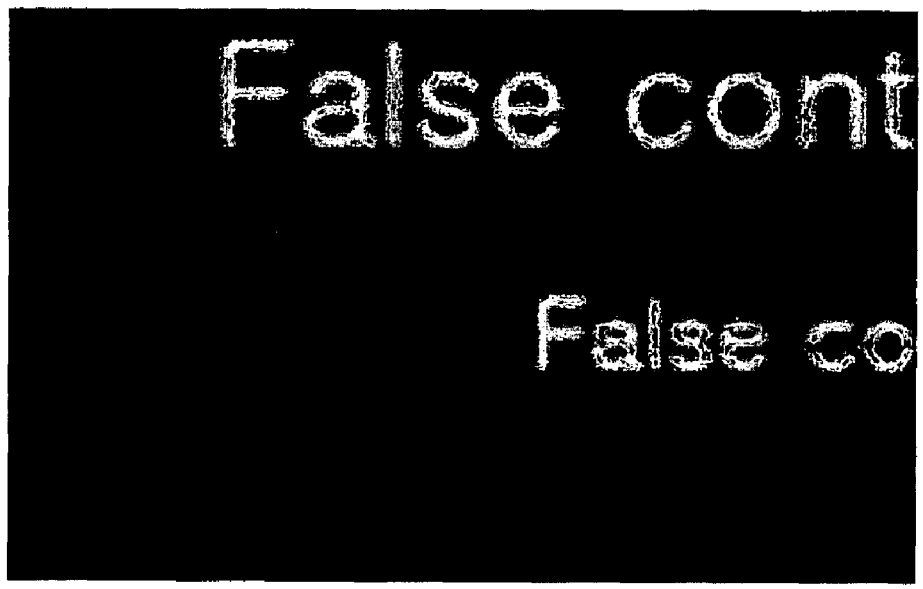
Figure 6D:

FIG. 6A to FIG. 6D are views for explaining an application of the present invention to a region of an input image on which no false contour exists. FIG. 6A shows an input image, and FIG. 6B shows a false contour-removed input image by the conventional Daly and Feng method. Further, FIG. 6C shows a false contour-removed input image by the present invention applied to an RGB channel, and FIG. 6D shows a false contour-removed input image by the present invention applied to a YCbCr channel.

In FIG. 6A to FIG. 6B, it can be seen that the false contour-removed input image by the conventional Daly and Feng method is degraded since smoothing is performed over the entire input image for false contour removal. That is, the Daly and Feng method degrades an input image by performing smoothing over edges and texture that are signal components, when removing a false contour. In particular, it can be seen that the Daly and Feng method produces severe blurring over text, that is, characters.

In FIG. 6C and FIG. 6D, it can be seen that a false contour-removed input image by the present invention applied to an RGB channel and a YCbCr channel is not degraded unlike an input image of FIG. 6B by the Daly and Feng method, for the false contour removal method according to the present invention detects a false contour area from an input image, and performs false smoothing over only the false contour area.

Figure 7A:
FIG. 7A to FIG. 7D are views for explaining false contour removal through edge detection with the same threshold value applied over an entire input image.
Figure 7B:
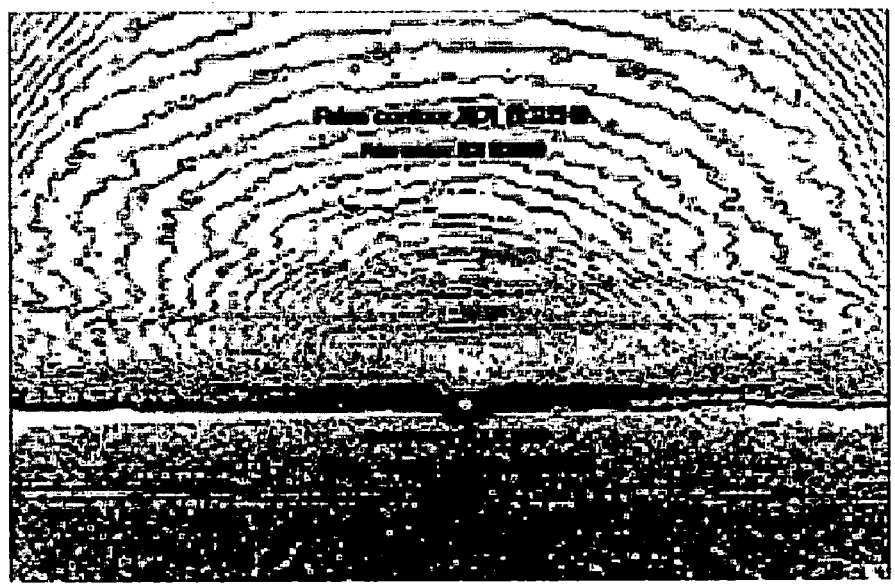
Figure 7C:
Figure 7D:

FIG. 7A to 7D are views for explaining false contour removal through edge detection with the same threshold value applied over an entire input image. FIG. 7A shows an input image, and FIG. 7B shows a false contour-removed input image by the conventional Daly and Feng method. Further, FIG. 7C shows a false contour-removed input image by the present invention applied to an RGB channel, and FIG. 7D shows a false contour-removed input image by the present invention applied to a YCbCr channel.

In FIG. 7A, it can be seen that an input image contains a sky part as a flat region having a rainbow-like pattern formed about the sun floating on water, which is substantially a false contour being a noise component rather than signal components such as edges or texture.

In FIG. 7B, it can be seen that a false contour-removed input image by the conventional Daly and Feng method has the sky part with the edge-like false contour reduced, but still has the false contour on the sky part.

In FIG. 7C and FIG. 7D, it can be seen that a false contour-removed input image by the present invention applied to an RGB channel and a YCbCr channel shows the sky part from which the false contour is nearly all removed, compared to FIG. 7B.

As aforementioned, the present invention can remove a flat region from an input image, detect only a contour area, and detect a false contour area from the detected contour area, thereby reducing computation time for false contour detection. Further, the present invention detects a false contour from a contour area containing edges and a false contour rather than detecting a false contour from the entire input image, flat region, edges, and false contour, thereby requiring only one threshold value for distinguishing edges and a false contour.

The present invention may be embodied as a computer-readable recording medium having embodied thereon a program for executing a method for adaptive false contour reduction. The computer-readable recording medium may be any recording apparatus capable of storing data that is read by a computer system.

Further, the present invention can automatically remove a flat region by using a brightness value difference between a bit depth-reduced image and an original input image and detect a false contour, thereby enhancing a precision degree of false contour detection.

Further, the present invention does not degrade signal components by performing smoothing over only a false contour, so as to adaptively remove a false contour.

Further, the present invention can perform smoothing in a short time by using the one-dimensional directional filter upon removing a false contour.

Further, the present invention can detect and remove a false contour even when the causes of false-contour occurrence are not known.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for adaptive false contour reduction, the method comprising:

detecting contour location information by removing a flat region having certain brightness values from a first input image based on a brightness value difference between the first input image and a second input image generated by reducing a bit depth of the first input image;

detecting false contour direction and location information by measuring a directional contrast of the first image in which the flat region is removed, and distinguishing the false contour area and an edge area out of the false contour location information based on the directional contrast; and removing the false contour from the first input image by smoothing the false contour area by using the false contour direction and location information.

2. The method as claimed in claim 1, wherein the detecting the contour location information comprises:

outputting the second input image;

calculating the brightness difference value between the first and second input images, and calculating an absolute value of the brightness difference value; and detecting as a contour location a location at which the absolute value of the brightness difference value varies.

3. The method as claimed in claim 1, wherein the distinguishing the false contour area and the edge area comprises:

measuring directional contrast values about a center pixel in the first input image in which the flat region is removed, and detecting a direction having a maximum contrast value; and comparing the maximum contrast value and a threshold value, and deciding the center pixel as a false contour if the maximum contrast value is lower than the threshold value.

4. The method as claimed in claim 3, wherein the maximum contrast value contrast$_{max}$ is detected based on an equation:

$$contrast_{max} = \max\left[\sum_{i=0}^{M-1}\sum_{j=0}^{N-1}\frac{(I_{i,j}-I_{i+1,j})^2}{MN}, \sum_{i=0}^{M-1}\sum_{j=0}^{N-1}\frac{(I_{i,j}-I_{i+1,j+1})^2}{MN}, \sum_{i=0}^{M-1}\sum_{j=0}^{N-1}\frac{(I_{i,j}-I_{i+1,j-1})^2}{MN}, \sum_{i=0}^{M-1}\sum_{j=0}^{N-1}\frac{(I_{i,j}-I_{i+1,j+1})^2}{MN}\right]$$

where M and N denote numbers indicating sizes of masks used in a contour area, I denotes a brightness of a location of a contour line detected out of the first input image, i and j denote pixel positions, and $I_{ij}$ denotes a center pixel.

5. The method as claimed in claim 1, wherein the false contour area and the edge area are distinguished based on at least one of distribution, entropy, flatness, and uniformity of the first input image in which the flat region is removed, and the false contour is removed based on the false contour location information.

6. The method as claimed in claim 1, wherein the removing the false contour removes the false contour by vertically filtering the false contour pixel by pixel using a one-dimensional direction smoothing filter.

7. The method as claimed in claim 6, wherein a number of taps of the one-dimensional directional smoothing filter is adjusted depending on whether the edge area is included in a filtering range.

8. The method as claimed in claim 6, wherein a coefficient h(n) of the one-dimensional directional smoothing filter is expressed in an equation:

$$h(n) = \frac{1}{16} \times [1, 1, 2, 2, 4, 2, 2, 1, 1].$$

9. The method as claimed in claim 6, wherein a direction $\theta_{ij}^f$ of the one-dimensional directional smoothing filter is calculated based on an equation:

$$\theta_{ij}^f = \theta_{ij} - 90°$$

where $\theta_{ij}$ denotes a direction of the detected false contour.

10. An apparatus for adaptive false contour reduction, the apparatus comprising:

a computer comprising:

a flat region removal part which detects contour location information by removing a flat region having certain brightness values from a first input image based on a bright value difference between the first input image and a second input image generated by reducing a bit depth of the first input image;

a false contour detection part which detects false contour direction and location information by measuring a directional contrast of the first in which the flat region is removed image, and distinguishes the false contour area and an edge area out of the false contour location information based on the directional contrast; and a smoothing part which removes the false contour from the first input image by smoothing the false contour area by using the false contour direction and location information.

11. The apparatus as claimed in claim 10, wherein the flat region removal part comprises:

a bit depth reduction unit which outputs the second input image;

a first arithmetic logic unit which calculates the brightness difference value between the first and second input images, a second arithmetic logic unit which calculates an absolute value of the brightness difference value; and a detection unit which detects as a contour location a location at which the absolute value of the brightness difference value varies.

12. The apparatus as claimed in claim 10, wherein the false contour detection part comprises:

a measurement unit which detects a maximum contrast value by measuring directional contrast values about a center pixel in the first input image in which the flat region is removed; and a comparison unit which decides the center pixel as a false contour if the maximum contrast value is lower than the threshold value by comparing the maximum contrast value and the threshold value.

13. The apparatus as claimed in claim 12, wherein the measurement unit outputs information of a direction having the maximum contrast value to the smoothing part if the center pixel is decided to be the false contour.

14. The apparatus as claimed in claim 12, wherein the comparison unit outputs location information of the center pixel to the smoothing part if the center pixel is decided to be the false contour.

15. The apparatus as claimed in claim 12, wherein the comparison unit detects the maximum contrast value contrast$_{max}$ by using an equation:

$$contrast_{max} = \max\left[\sum_{i=0}^{M-1}\sum_{j=0}^{N-1}\frac{(I_{i,j}-I_{i+1,j})^2}{MN}, \sum_{i=0}^{M-1}\sum_{j=0}^{N-1}\frac{(I_{i,j}-I_{i+1,j+1})^2}{MN}, \sum_{i=0}^{M-1}\sum_{j=0}^{N-1}\frac{(I_{i,j}-I_{i+1,j-1})^2}{MN}, \sum_{i=0}^{M-1}\sum_{j=0}^{N-1}\frac{(I_{i,j}-I_{i+1,j+1})^2}{MN}\right]$$

here M and N denote numbers indicating sizes of masks, I denotes a brightness of a location of a contour line detected out of the first input image, and i and j denote pixel positions, and $I_{ij}$ denotes a center pixel.

16. The apparatus as claimed in claim 10, wherein the false contour detection part distinguishes the false contour area and the edge area by using at least one of distribution, entropy, flatness, and uniformity of the flat region-removed first input image, and the smoothing part removes the false contour by using the false contour location information.

17. The apparatus as claimed in claim 10, wherein the smoothing part comprises a one-dimensional directional smoothing filter which removes the false contour by vertically filtering the false contour area pixel by pixel.

18. The apparatus as claimed in claim 17, wherein a number of taps of the one-dimensional directional smoothing filter is adjusted depending on whether the edge area is included in a filtering range.

19. The apparatus as claimed in claim 17, wherein a coefficient h(n) of the one-dimensional directional smoothing filter is expressed in an equation:

$$h(n) = \frac{1}{16} \times [1, 1, 2, 2, 4, 2, 2, 1, 1].$$

20. The apparatus as claimed in claim 17, wherein a direction $\theta_{ij}^f$ of the one-dimensional directional smoothing filter is calculated based on an equation:

$$\theta_{ij}^f = \theta_{ij} - 90°$$

where $\theta_{ij}$ denotes a direction of the detected false contour.

21. A computer-readable recording medium containing execution code which executes a method for adaptive false contour reduction, the method comprising: detecting contour location information by removing a flat region having certain brightness values from a first input image based on a bright value difference between the first input image and a second input image generated by reducing a bit depth of the first input image;

distinguishing a false contour area and an edge area out of the false contour location information by using directional contrast measured over the first image in which the flat region is removed; and removing the false contour from the first input image by smoothing the false contour area.

* * * * *